(12) United States Patent
Hardin

(10) Patent No.: US 10,209,364 B2
(45) Date of Patent: Feb. 19, 2019

(54) ANTI-THEFT DEVICE, SYSTEM AND METHOD FOR VALUABLES

(71) Applicant: Timothy Carl Hardin, Santa Rosa Beach, FL (US)

(72) Inventor: Timothy Carl Hardin, Santa Rosa Beach, FL (US)

( * ) Notice: Subject to any disclaimer, the term of this patent is extended or adjusted under 35 U.S.C. 154(b) by 355 days.

(21) Appl. No.: 15/166,867

(22) Filed: May 27, 2016

(65) Prior Publication Data

US 2017/0343676 A1    Nov. 30, 2017

(51) Int. Cl.
*G01S 19/16* (2010.01)
*G08B 13/24* (2006.01)

(52) U.S. Cl.
CPC .......... *G01S 19/16* (2013.01); *G08B 13/2431* (2013.01)

(58) Field of Classification Search
CPC ........ G01S 19/16; G01S 19/34; G01S 5/0027; G01S 13/86; G01S 17/023; G01S 7/003; G01S 13/87; G01S 13/88; G08B 13/2431; G08B 21/0288; G08B 25/016
USPC .................................................. 342/357.54
See application file for complete search history.

(56) References Cited

U.S. PATENT DOCUMENTS

| | | | | |
|---|---|---|---|---|
| 5,786,789 A | * | 7/1998 | Janky ............... | G01S 5/0027 342/357.4 |
| 2011/0148626 A1 | * | 6/2011 | Acevedo ............ | G01S 5/0027 340/539.13 |

FOREIGN PATENT DOCUMENTS

CN            105395180 A    *   3/2016

* cited by examiner

*Primary Examiner* — Harry K Liu
(74) *Attorney, Agent, or Firm* — Dunlap Bennett & Ludwig PLLC

(57) ABSTRACT

An anti-theft system that is capable of being tracked by and automatically notifies the appropriate authorities when leaving a designated geo-fence area. The anti-theft system includes a storage device having two opaque housing portions that can be secured together along their respective peripheries, providing a cavity. The housing portions are opaque except for a cutout in one of the housing portions. The cavity provides a GPS and a mounting display, wherein the mounting display secure a valuable so that it is partially visible through the cutout, while the GPS is not so visible. The GPS tracks and notifies according to predetermined criteria.

1 Claim, 2 Drawing Sheets

ANTI-THEFT DEVICE, SYSTEM AND METHOD FOR VALUABLES

BACKGROUND OF THE INVENTION

The present invention relates to anti-theft devices and, more particularly, to an anti-theft system that embodies a storage device that is capable of being tracked by and automatically notifies the appropriate authorities when removed from a designated geo-fence area, wherein the storage device enables continuous visual identification of the valuables it secures.

Current anti-theft tracking devices for valuables require the tracking device be attached to or even embedding in the valuable to be protected. Unfortunately, there are many valuables that such attachment means would either be unrealistic, like valuable coins, and/or would permanently damage or undermine its financial value and/or aesthetic value. Moreover, current anti-theft devices may completely shroud the valuable they aim to prevent theft of, and so also diminish the valuables' financial and/or aesthetic value.

As can be seen, there is a need for an anti-theft system that embodies a storage device that is capable of being tracked by and automatically notifies the appropriate authorities when removed from a designated geo-fence area, wherein the storage device enables continuous visual identification of the valuables it secures.

SUMMARY OF THE INVENTION

In one aspect of the present invention, an anti-theft storage device includes a first housing having a first flat base and a plurality of first peripheral sidewalls; a cutout provided by the first flat base; a second housing having a second flat base and a plurality of second peripheral sidewalls, wherein the plurality of first and second peripheral sidewalls are dimensioned to engage each other in a closed configuration, defining a cavity; a GPS provided within the cavity; and a mounting display disposed within the cavity so as to be partially visible through the cutout.

In another aspect of the present invention, the anti-theft storage device further includes a first and second flange provided by each of the plurality of first and second peripheral sidewalls, respectively, so that in the closed configuration the first and second flanges are nested, wherein each flat base provides corner fastener connectors for securing the first and second housings in the closed configuration, further including a transparent window in the cutout, wherein the GPS is not visible through the cutout, wherein the GPS is configured to send a notification signal under predetermined criteria, wherein the predetermined criteria is associated with a predetermined area, and wherein the mounting display is adapted to secure a valuable, and further including at least one valuable secured within the mounting display so that a portion of the at least one valuable is visible through the cutout.

In yet another aspect of the present invention, the anti-theft storage device includes a first housing having a first flat base and a plurality of first peripheral sidewalls, each first peripheral sidewall extending to a first flange; a transparent window provided by the first flat base; a second housing having a second flat base and a plurality of second peripheral sidewalls, each second peripheral sidewall extends to a second flange, wherein the plurality of first and second peripheral sidewalls are dimensioned so that the first and second flanges nest in a closed configuration, defining a cavity; a plurality of fastener connectors provided along the first and second flat bases so that they align in the closed configuration; a mounting display disposed within the cavity so as to be partially visible through the cutout; and a GPS provided within the cavity wherein the GPS is not visible through the cutout, and wherein the GPS is configured to send a notification signal under predetermined criteria.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an anti-theft system that is capable of being tracked by and automatically notifies the appropriate authorities when leaving a designated geo-fence area. The anti-theft system includes a storage device having two opaque housing portions that can be secured together along their respective peripheries, providing a cavity. The housing portions are opaque except for a cutout in one of the housing portions. The cavity provides a GPS and a mounting display, wherein the mounting display secure a valuable so that it is partially visible through the cutout, while the GPS is not so visible. The GPS tracks and notifies according to predetermined criteria.

Figure 1:
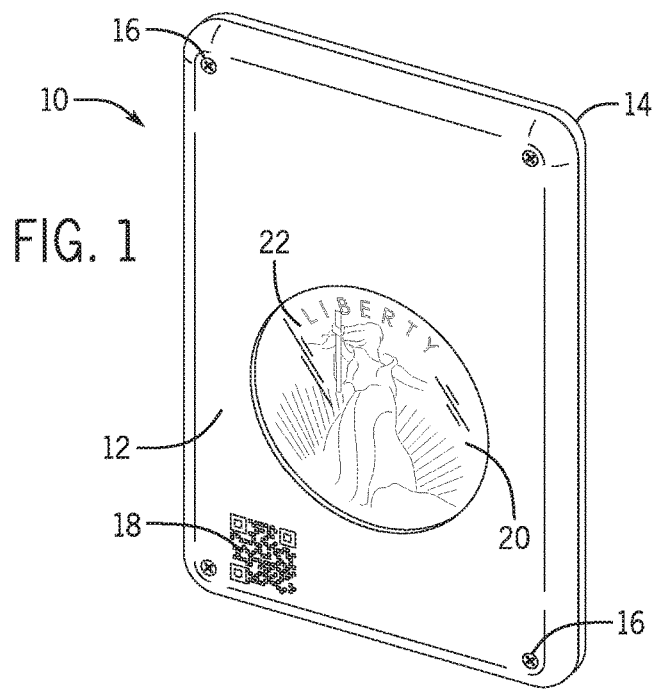
FIG. 1 is a front perspective view of an exemplary embodiment of the present invention.
Figure 2:
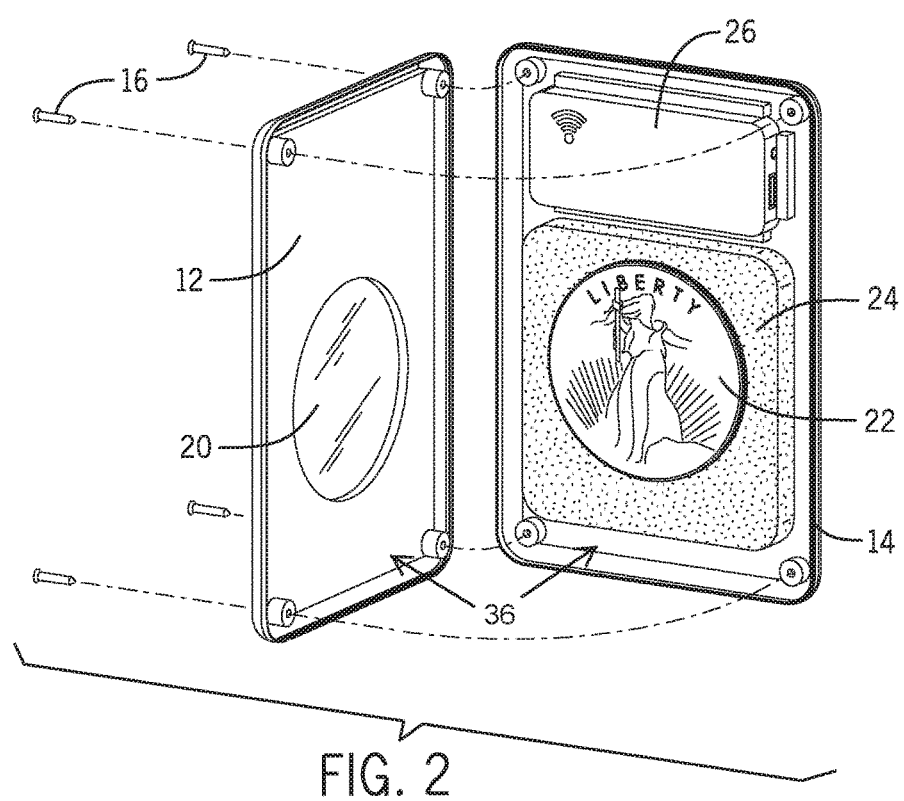
FIG. 2 is an exploded perspective view of an exemplary embodiment of the present invention.
Figure 3:
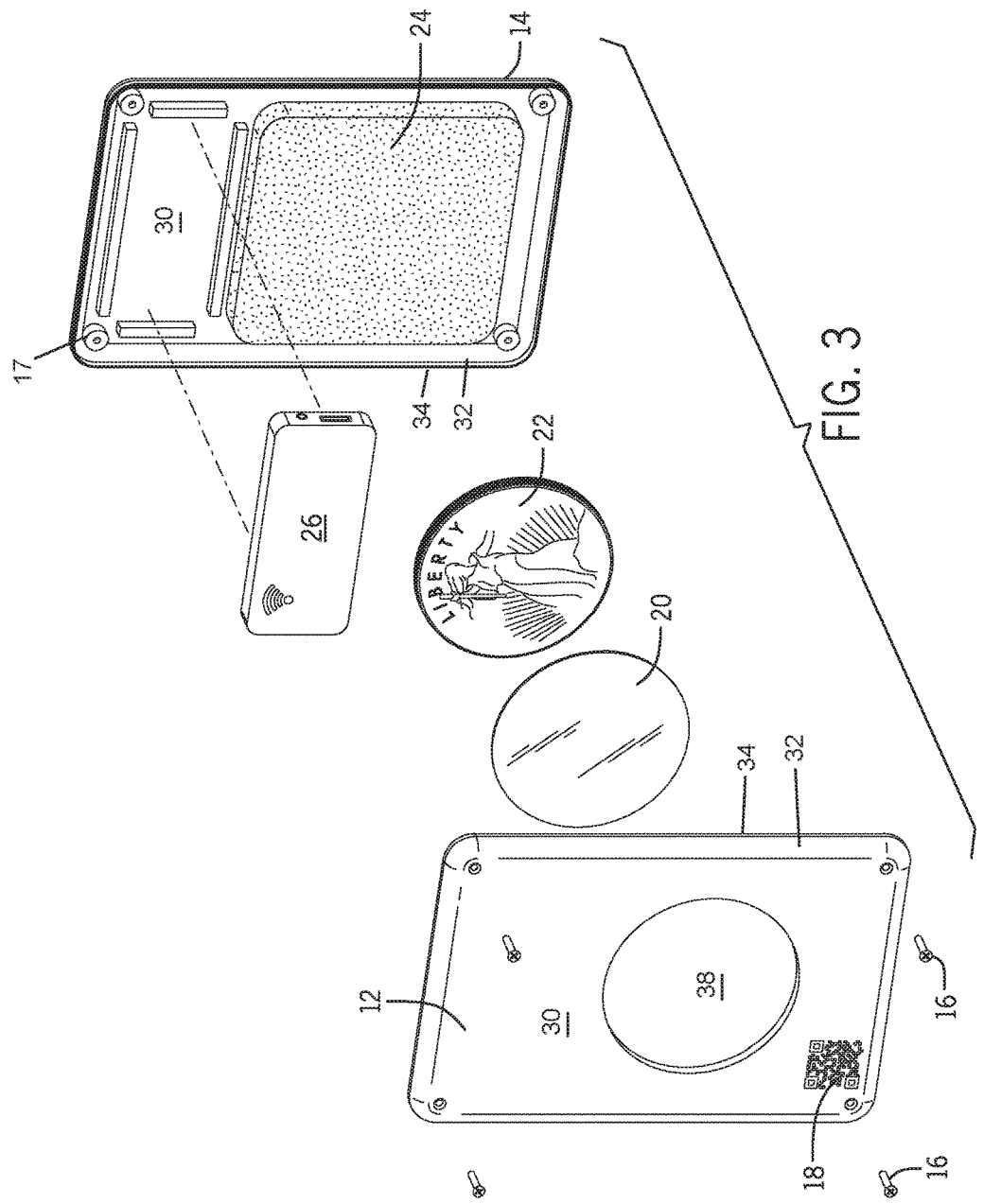
FIG. 3 is an exploded view of an exemplary embodiment of the present invention.

Referring to FIGS. 1 through 3, the present invention may include a storage device 10. The storage device 10 may include includes a first housing 12 and a second housing 14, each housing having a flat base 30 and peripheral sidewalls 32. The peripheral sidewalls 32 may have straight sides with radiused corners, as well as circular, oblong, or other curvilinear geometries. The first and second housings 12, 14 are made of materials that may be shatter-proof and/or sufficiently resistant to puncture and rending, such as various plasticized materials, acrylic-based materials, or the like.

Sidewalls 32 may extend to a flange 34. The sidewalls 32 of the first and second housing 12, 14 may be adapted and dimensioned so that when operatively engaged in a closed configuration, their respective flanges 32 nest, providing a tight seal along the engaged sidewalls 32, whereby the bases 30 and sidewalls 32 define a cavity 36. Thereafter, the first and second housing 12, 14 may be secured together by engaging fasteners 16 and aligned fastener connectors 17, as illustrated in FIG. 2. Subsequently, the first and second housing 12, 14 may be unsecured (by removing the fasteners 16 from the aligned fastener connectors 17) and moved to an open configuration for accessing the cavity 36. In certain embodiments, in place of engaging fasteners 16 and aligned fastener connectors 17, the first and second housings 12,14 may be secured in the closed configuration by adhesive, glue or the like.

The first housing 12 base 30 may define a cutout 38 so that a portion of the cavity 36 is visible through the first housing 12. The cutout 38 may provide a transparent window 20. The second housing 14 base 30 may provide a display mount 22 for securing a predetermined valuable 22 within the cavity 36 so that a portion of the valuable 22 is visible through the cutout 38. The predetermined valuable 22 may be anything a user deems valuable, including but not limited to a lucky coin, a gold bullion, a medal, an ornament, jewelry, and the like.

A global positioning system (GPS) 26 is provided within the cavity 36. The GPS 26 is adapted to provide location and time information to a receiver. In certain embodiments, the GPS 26 may be a logger. In some embodiments, the GPS 26 may be a device with a "breadcrumb" functionality adapted to disclose the path of travel. In alternative embodiments, the GPS 26 may have optional video/audio enhancement to provide location and time information to the receiver. The GPS 26 may provide cordless charging. The GPS 26 may be disposed in the cavity 36 along a portion that is not visible when the storage device 10 is in the closed configuration, being that the first and second housing 12, 14 are opaque other than the cutout 38. In certain embodiment, the GPS 26 may be electronically connected to a microprocessor and a form of memory. The microprocessor/GPS 26 may be adapted to transmit a notification signal accordingly to set criteria. The microprocessor/GPS 26 may be adapted to assume a sleep mode that is awakened by movement or by vibration.

The thickness of the first and second housings 12, 14 may be dependent on the thickness of the GPS 26 unit. In certain embodiments, the storage device 10 may provide a QR code 18 along an outer portion.

A method of using the present invention may include the following. The storage device 10 disclosed above may be provided. In the open configuration, the user may secure the predetermined valuable 22 in the display mount 24, as illustrated in FIG. 2. Then moving the first and second housing 12, 14 to the closed configuration and engaging the fasteners 16 in the aligned fastener connectors 17, thereby securing the valuable 22 in the cavity 36. As a result, the valuable 22 is visible through the cutout 38 so that viewers, buyers and the like can identify the secured valuable 22. Moreover, the GPS 26 globally tracks the position of the secured valuable 22.

Furthermore, the user may establish a geo fence (not shown) defining a geo area, so that when the GPS 26 leaves the geo area, the notification signal is transmitted to a designated authority, like the owner of the valuable, governmental authorities, insurance providers, and the like.

It should be understood, of course, that the foregoing relates to exemplary embodiments of the invention and that modifications may be made without departing from the spirit and scope of the invention as set forth in the following claims.

What is claimed is:

1. A device, comprising:
   a first housing having a first flat base and a plurality of first peripheral sidewalls, each first peripheral sidewall extending to a first flange;
   a transparent window provided by the first flat base;
   a second housing having a second flat base and a plurality of second peripheral sidewalls, each second peripheral sidewall extends to a second flange, wherein the plurality of first and second peripheral sidewalls are dimensioned so that the first and second flanges nest in a closed configuration, defining a cavity;
   a plurality of fastener connectors provided along the first and second flat bases so that they align in the closed configuration;
   a mounting display disposed within the cavity so as to be partially visible through the cutout; and
   a GPS provided within the cavity wherein the GPS is not visible through the cutout, and wherein the GPS is configured to send a notification signal under predetermined criteria.

\* \* \* \* \*